(12) United States Patent
Oe et al.

(10) Patent No.: US 8,871,400 B2
(45) Date of Patent: Oct. 28, 2014

(54) FUEL CELL SYSTEM AND METHOD FOR OPERATING FUEL CELL SYSTEM

(75) Inventors: Jun Oe, Shiga (JP); Hiroaki Kan, Shiga (JP)

(73) Assignee: Panasonic Corporation, Osaka (JP)

( * ) Notice: Subject to any disclaimer, the term of this patent is extended or adjusted under 35 U.S.C. 154(b) by 107 days.

(21) Appl. No.: 13/380,453

(22) PCT Filed: Mar. 3, 2011

(86) PCT No.: PCT/JP2011/001255
§ 371 (c)(1),
(2), (4) Date: Dec. 22, 2011

(87) PCT Pub. No.: WO2011/108274
PCT Pub. Date: Sep. 9, 2011

(65) Prior Publication Data
US 2012/0115052 A1 May 10, 2012

(30) Foreign Application Priority Data
Mar. 4, 2010 (JP) .................................. 2010-047451

(51) Int. Cl.
*H01M 8/04* (2006.01)

(52) U.S. Cl.
USPC ............................ 429/434; 429/428; 429/433

(58) Field of Classification Search
None
See application file for complete search history.

(56) References Cited

U.S. PATENT DOCUMENTS

| | | | |
|---|---|---|---|
| 2005/0164056 A1* | 7/2005 | Tanaka et al. | ................... 429/24 |
| 2007/0160881 A1 | 7/2007 | Ukai et al. | |
| 2009/0020281 A1 | 1/2009 | Ueda et al. | |
| 2009/0130529 A1 | 5/2009 | Yamamoto et al. | |
| 2010/0297513 A1* | 11/2010 | Yasuda et al. | ................. 429/423 |

FOREIGN PATENT DOCUMENTS

| | | | | |
|---|---|---|---|---|
| JP | 08-138714 A | | 5/1996 | |
| JP | 2002-270194 A | | 9/2002 | |
| JP | 2006-147348 | * | 6/2006 | ............. H01M 8/04 |
| JP | 2007-234477 A | | 9/2007 | |
| JP | 2008-300067 A | | 12/2008 | |
| JP | 2008-300314 A | | 12/2008 | |

(Continued)

OTHER PUBLICATIONS

Machine translation of JP 2007-234477, retrieved from <http://www19.ipdl.inpit.go.jp/PA1/cgi-bin/PA1INDEX> on Jul. 30, 2013.*

(Continued)

*Primary Examiner* — Cynthia K. Walls
(74) *Attorney, Agent, or Firm* — McDermott Will & Emery LLP

(57) ABSTRACT

A fuel cell system of the present invention is a fuel cell system including a fuel cell and includes a medium circulation passage, a heat medium tank, a first circulator, a recovered water tank, a water circulation passage, a second circulator, a water purifier, a temperature detector, and a controller. The heat medium circulation passage and the water circulation passage are configured so as to realize heat exchange between a heat medium and water. The controller executes a circulation operation in which when the temperature detector detects a temperature lower than a first temperature capable of sterilizing microorganisms, the second circulator is caused to operate such that the temperature detected by the temperature detector becomes the first temperature or higher. The controller forbids the operation of the second circulator when the temperature detector detects a temperature equal to or higher than a second temperature that is lower than a temperature at which heat deterioration of the water purifier occurs.

18 Claims, 7 Drawing Sheets

(56) References Cited

FOREIGN PATENT DOCUMENTS

| | | |
|---|---|---|
| JP | 2010-113885 A | 5/2010 |
| JP | 2010-170877 A | 8/2010 |
| WO | WO 2005/074064 A1 | 8/2005 |
| WO | WO 2006/088053 A1 | 8/2006 |
| WO | WO 2006/095555 A1 | 9/2006 |

OTHER PUBLICATIONS

Machine translation of JP 2006-147348, retrieved from <http://www19.ipdl.inpit.go.jp/PA1/cgi-bin/PA1INDEX> on Jul. 30, 2013.*

International Search Report for International Application No. PCT/JP2011/001255, dated Jun. 7, 2011, 2 pages.

* cited by examiner

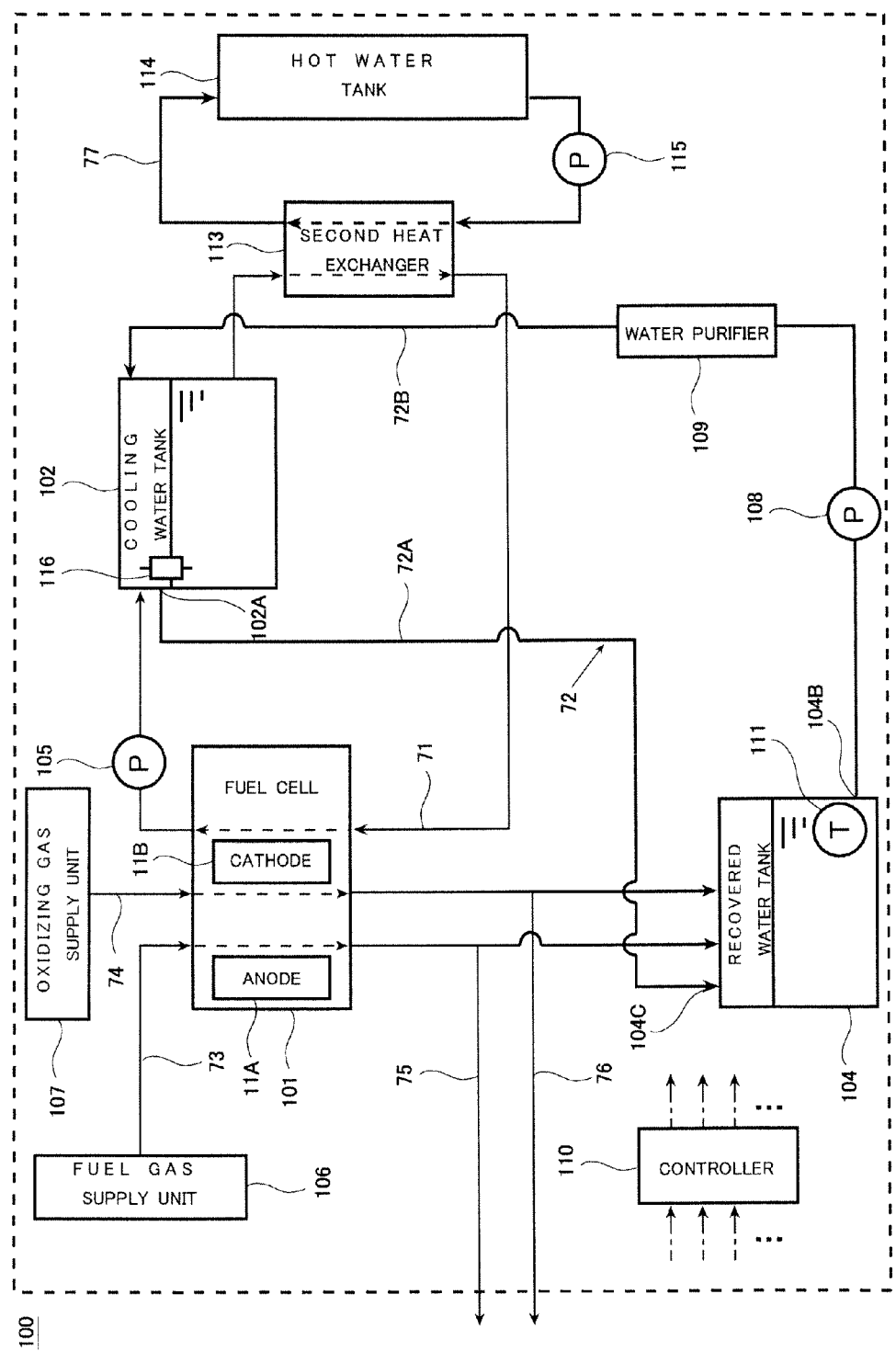

FUEL CELL SYSTEM AND METHOD FOR OPERATING FUEL CELL SYSTEM

This application is 371 application of PCT/JP2011/001255 having an international filing date of Mar. 3, 2011, which claims priority to JP2010-047451 filed Mar. 4, 2010, the entire contents of which are incorporated herein by reference.

TECHNICAL FIELD

The present invention relates to a fuel cell system including a fuel cell and a method for operating the fuel cell system.

BACKGROUND ART

A fuel cell system is a system configured to generate electric power and heat by an electrochemical reaction between a fuel gas (hydrogen-containing gas) and an oxidizing gas (for example, air) supplied to a fuel cell. The electric power generated by a common domestic fuel cell system is supplied to some of home-use electric power loads (for example, electrical appliances, such as lights and air conditioners). The heat generated by the electric power generation is recovered by cooling water supplied into the fuel cell. The recovered heat is recovered as hot water through, for example, a heat exchanger and supplied to domestic heat loads (for example, heat utilizing devices, such as water heaters and floor heating).

Since an infrastructure for supplying the hydrogen-containing gas necessary in the electric power generating operation of the fuel cell system is not developed, the fuel cell system is normally provided with a reformer configured to generate the hydrogen-containing gas. The reformer generates the hydrogen-containing gas by causing a steam-reforming reaction in a reforming catalyst between a material gas (for example, city gas (natural gas)) and water.

In such fuel cell system, a method for utilizing the water recovered in the system, that is, a method for supplying the water by itself is adopted in many cases as a supply source of the water supplied to the reformer and the cooling water. One example of a method for recovering the water in the fuel cell system is a method for recovering the water by cooling and condensing steam contained in the fuel gas and oxidizing gas discharged from the fuel cell.

However, the water (hereinafter referred to as "recovered water") recovered in the fuel cell system does not contain sterilizing components, such as chloride components. In addition, when recovering the recovered water, the recovered water flows through various parts and pipes in the fuel cell system. Therefore, the recovered water contains a small amount of impurities, such as organic constituents (TOC; Total Organic Carbon). Thus, the recovered water is in a state preferable for the proliferation of microorganisms, such as fungi and bacteria.

Therefore, the microorganisms, such as the fungi, may proliferate in the system by the infiltration of the microorganisms, such as the fungi, through an exhaust port through which the oxidizing gas is discharged after the recovery of the water, a discharge port through which a surplus of the recovered water is discharged, or the like. Then, by the proliferation of the microorganisms, the clogging or narrowing of a passage through which the recovered water flows may occur, and this may deteriorate a water supply function and a water purification function.

To solve the above problems, a fuel cell cogeneration system (see PTL 1, for example) is known, in which the temperature of the water is temporarily increased to a predetermined temperature (For example, 70° C.), necessary for heat sterilization, or higher. In addition, a fuel cell power generation system (see PTL 2, for example) is known, which includes: a recovered water tank configured to store recovered water recovered from an exhaust gas of the fuel cell; a first purifying unit configured to purify the recovered water; and a second purifying unit having a heatproof temperature higher than the heatproof temperature of the first purifying unit, and in which when the temperature of the recovered water in the recovered water tank is higher than the heatproof temperature of the first purifying unit, the water is prevented from flowing through the first purifying unit.

PTL 1: Japanese Laid-Open Patent Application Publication No. 2002-270194
PTL 2: Japanese Laid-Open Patent Application Publication No. 2007-234477

SUMMARY OF THE INVENTION

Technical Problem

However, there is still room for improvement in prior arts, such as PTLs 1 and 2 in order to secure adequate durability (for example, 10-year durability) required in regions where the system is installed.

Specifically, in the fuel cell cogeneration system disclosed in PTL 1, the heat deterioration of ion-exchange resin is not considered. Therefore, if the temperature of the water is increased to a predetermined temperature or higher, the heat deterioration of the ion-exchange resin may occur. In the fuel cell power generation system disclosed in PTL 2, low heat resistance anion-exchange resin is used in the first purifying unit, and high heat resistance cation-exchange resin is used in the second purifying unit. The use of two types of ion-exchange resin causes the increase in cost of the system. In addition, when the water in the recovered water tank is high in temperature, the water is not supplied to the first purifying unit. Therefore, the anion exchange is not performed, and the water may not be adequately purified.

The present invention was made to solve the above conventional problems, and an object of the present invention is to provide a fuel cell system and a method for operating the fuel cell system, each of which is capable of: reducing the cost and more surely purifying the water by simplifying the configuration of the system; and making the maintenance frequency of a water purifier lower than that of each of conventional fuel cell systems by increasing the life of the water purifier.

Solution to Problem

In order to solve the above problems, a fuel cell system according to the present invention is a fuel cell system including a fuel cell and includes: a heat medium circulation passage through which a heat medium for recovering exhaust heat of the fuel cell circulates; a heat medium tank disposed on the heat medium circulation passage and configured to store the heat medium; a first circulator disposed on the heat medium circulation passage and configured to cause the heat medium to circulate; a recovered water tank configured to store water recovered from an exhaust gas generated by the fuel cell system; a water circulation passage which is connected to the recovered water tank and through which the water circulates; a second circulator disposed on the water circulation passage and configured to cause the water to circulate; a water purifier disposed on the water circulation passage and configured to purify the water; a temperature detector provided at any one of the recovered water tank, the water purifier, and the water circulation passage extending between the recovered water tank and the water purifier and configured to detect a temperature of the water; and a controller, wherein: the heat medium circulation passage and the water circulation passage are configured so as to realize heat exchange between the heat medium and the water; the controller executes a circulation operation in which when the temperature detector detects a temperature lower than a first temperature capable of sterilizing microorganisms, the second circulator is caused to operate such that the temperature detected by the temperature detector becomes the first temperature or higher; and the controller forbids the operation of the second circulator when the temperature detector detects a temperature equal to or higher than a second temperature that is a temperature higher than the first temperature and lower than a temperature at which heat deterioration of the water purifier occurs.

With this, by increasing the life of the water purifier, the maintenance frequency of the water purifier can be made lower than that of each of the conventional fuel cell systems.

A method for operating a fuel cell system according to the present invention is a method for operating a fuel cell system including a fuel cell, the fuel cell system including: a heat medium circulation passage through which a heat medium for recovering exhaust heat of the fuel cell circulates; a heat medium tank disposed on the heat medium circulation passage and configured to store the heat medium; a first circulator disposed on the heat medium circulation passage and configured to cause the heat medium to circulate; a recovered water tank configured to store water recovered from an exhaust gas generated by the fuel cell system; a water circulation passage which is connected to the recovered water tank and through which the water circulates; a second circulator disposed on the water circulation passage and configured to cause the water to circulate; a water purifier disposed on the water circulation passage and configured to purify the water; and a temperature detector provided at any one of the recovered water tank, the water purifier, and the water circulation passage extending between the recovered water tank and the water purifier and configured to detect a temperature of the water, the heat medium circulation passage and the water circulation passage being configured so as to realize heat exchange between the heat medium and the water, the method comprising the steps of: when the temperature detector detects a temperature lower than a first temperature capable of sterilizing microorganisms, causing the second circulator to operate such that the temperature detected by the temperature detector becomes the first temperature or higher; and forbidding the operation of the second circulator when the temperature detector detects a temperature equal to or higher than a second temperature that is a temperature higher than the first temperature and lower than a temperature at which heat deterioration of the water purifier occurs.

With this, by increasing the life of the water purifier, the maintenance frequency of the water purifier can be made lower than that of each of the conventional fuel cell systems.

The above object, other objects, features and advantages of the present invention will be made clear by the following detailed explanation of preferred embodiments with reference to the attached drawings.

Advantageous Effects of the Invention

In accordance with the fuel cell system of the present invention and the method for operating the fuel cell system, by increasing the life of the water purifier, the maintenance frequency of the water purifier can be made lower than that of each of the conventional fuel cell systems.

BRIEF DESCRIPTION OF THE DRAWINGS

FIG. 7 is a block diagram schematically showing a schematic configuration of the fuel cell system of another example.

DETAILED DESCRIPTION OF THE PREFERRED EMBODIMENTS

Figure 1:
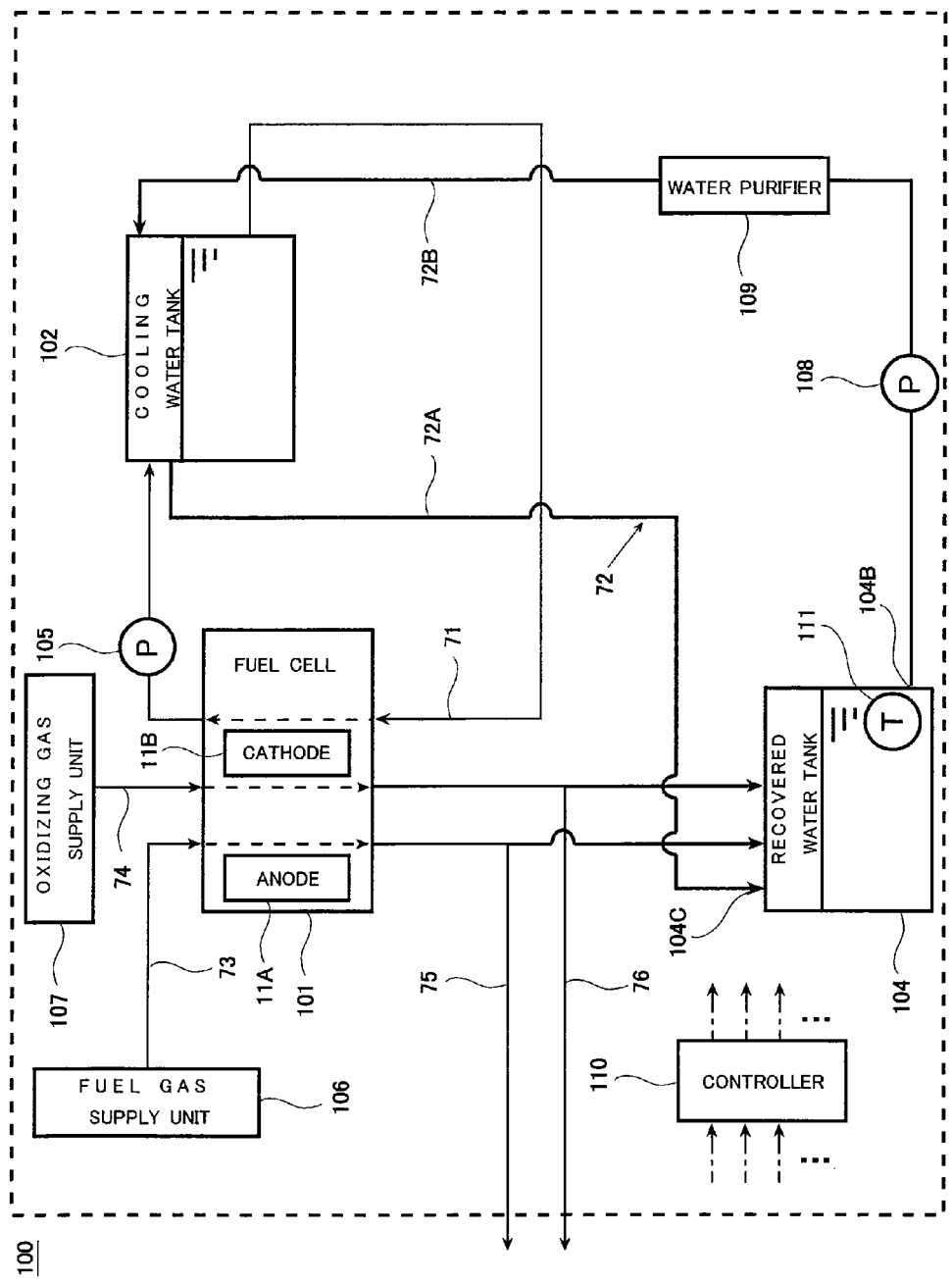
FIG. 1 is a block diagram schematically showing a schematic configuration of a fuel cell system according to Embodiment 1 of the present invention.

Hereinafter, embodiments of the present invention will be specifically explained. In the drawings, the same reference signs are used for the same or corresponding components, and a repetition of the same explanation is avoided. In addition, in the drawings, only the components necessary to explain the present invention are shown, and the other components are omitted. Further, the present invention is not limited to the embodiments below.

Embodiment 1

A fuel cell system according to Embodiment 1 is a fuel cell system including a fuel cell and includes: a heat medium circulation passage through which a heat medium for recovering exhaust heat of the fuel cell circulates; a heat medium tank disposed on the heat medium circulation passage and configured to store the heat medium; a first circulator disposed on the heat medium circulation passage and configured to cause the heat medium to circulate; a recovered water tank configured to store water recovered from an exhaust gas generated by the fuel cell system; a water circulation passage which is connected to the recovered water tank and through which the water circulates; a second circulator disposed on the water circulation passage and configured to cause the water to circulate; a water purifier disposed on the water circulation passage and configured to purify the water; a temperature detector provided at any one of the recovered water tank, the water purifier, and the water circulation passage extending between the recovered water tank and the water purifier and configured to detect a temperature of the water; and a controller, wherein: the heat medium circulation passage and the water circulation passage are configured so as to realize heat exchange between the heat medium and the water; the controller executes a circulation operation in which when the temperature detector detects a temperature lower than a first temperature capable of sterilizing microorganisms, the second circulator is caused to operate such that the temperature detected by the temperature detector becomes the first temperature or higher; and the controller forbids the operation of the second circulator when the temperature detector detects a temperature equal to or higher than a second temperature that is a temperature higher than the first temperature and lower than a temperature at which heat deterioration of the water purifier occurs.

Here, examples of the "exhaust gas generated by the fuel cell system" are: a fuel gas (hereinafter referred to as an "off fuel gas") unconsumed in the fuel cell; an oxidizing gas (hereinafter referred to as "off fuel gas") unconsumed in the fuel cell; and in a case where a hydrogen generator is provided in the fuel cell system, a flue gas discharged from a combustor configured to heat the hydrogen generator.

Moreover, "forbids the operation of the second circulator" includes a case of, when the second circulator is operating, stopping the second circulator and forbidding subsequent start-up of the second circulator and a case of, when the second circulator is in a stop state, forbidding the start-up of the second circulator even if a start-up command of the second circulator is input to the controller.

The microorganisms denotes a concept including at least one of bacteria, such as *Escherichia coli* and *Bacillus subtillus*, and fungi, such as mold.

The first temperature is suitably set depending on the type of the microorganisms which are prevented from proliferating.

The second temperature is suitably set depending on the type of the ion-exchange resin used in the water purifier. For example, the second temperature is arbitrarily set in advance by experiments, simulations, or the like based on, for example, a decrease rate of an ion-exchange capacity from an initial value in consideration of, for example, the maintenance frequency of the water purifier, the maintenance frequency being required at the region where the fuel cell system is installed.

The first temperature may be set to not lower than 40° C. and lower than 45° C., and the second temperature may be set to not lower than 45° C. and not higher than 50° C.

With this, by increasing the life of the water purifier, the maintenance frequency of the water purifier can be made lower than that of each of the conventional fuel cell systems.

In the fuel cell system according to Embodiment 1, the heat medium tank may be connected to a portion of the water circulation passage, the portion being located downstream of the water purifier.

With this, the water in the water circulation passage can be supplied to the heat medium tank, and the heat exchange between the water supplied to the heat medium tank and the heat medium can be performed in the heat medium tank.

In the fuel cell system according to Embodiment 1, the controller may be configured to perform the circulation operation while the fuel cell system is in a stop state.

Here, "while the fuel cell system is in a stop state" denotes a period from when the controller starts a stop process of the fuel cell system in a case where a stop command is input to the controller or in a case where a predetermined stop time has come until when the stop process terminates. In other words, "while the fuel cell system is in a stop state" denotes a period from when the controller outputs the stop command to each of devices of the fuel cell system until when respective steps to being ready for the next start-up of the fuel cell system terminate.

The stop process denotes, for example, a process in which: the electric power generation of the fuel cell is stopped; in a case where a below-described fuel gas supply unit is a hydrogen generator, the hydrogen generator is cooled; and a material gas is intermittently supplied to the hydrogen generator to suppress negative pressure (which is generated for the condensation of steam) in the hydrogen generator.

If the circulation operation is executed while the fuel cell is generating the electric power, the condensed water having a comparatively low temperature and the heat medium having a comparatively high temperature are mixed with each other, so that the temperature of the heat medium in the heat medium tank decreases. As a result, the amount of heat absorbed by the heat medium from the fuel cell becomes large, and the temperature of the fuel cell decreases. Thus, the electric power generating performance of the fuel cell may become unstable.

However, in accordance with the fuel cell system of Embodiment 1, since the circulation operation is performed while the fuel cell system is in a stop state, the decrease in temperature of the fuel cell can be suppressed, and the fuel cell can stably generate the electric power. In addition, by the above configuration, the fuel cell system according to Embodiment 1 can utilize the heat of the high-temperature heat medium immediately after the stop of the electric power generation of the fuel cell, so that energy saving can be realized.

Moreover, in the fuel cell system according to Embodiment 1, the controller may control the amount of operation of the second circulator such that the amount of operation of the second circulator is larger in a case where the circulation operation is performed while the fuel cell system is in the stop state than in a case where the circulation operation is not performed while the fuel cell is generating the electric power.

Moreover, in the fuel cell system according to Embodiment 1, the water circulation passage may include a first water passage through which the heat medium is supplied from the heat medium tank to the recovered water tank and a second water passage through which the water is supplied from the recovered water tank to the heat medium tank, and the temperature detector may be provided at a position which is closer to a second connecting port of the recovered water tank than a first connecting port of the recovered water tank, the first water passage being connected the first connecting port, the second water passage being connected to the second connecting port.

Further, in the fuel cell system according to Embodiment 1, the controller may be configured to execute the circulation operation for a second predetermined time every first predetermined time.

Here, the first predetermined time is suitably set depending on the configurations of, for example, the heat medium circulation passage, the heat medium tank, the water circulation passage, and the recovered water tank. For example, the first predetermined time may be set based on a circumstance, such as the recovered water tank, where the microorganisms may be generated. Specifically, the first predetermined time may be set based on three factors that are the temperature (air temperature and water temperature), the time in which the temperature is maintained, and the amount of impurities, such as organic components. These factors may be arbitrarily set by experiments, simulations, or the like in consideration of, for example, the air temperature of the region where the fuel cell system is set, the generated power output, generated power amount, and power generation time of the fuel cell system, and the specific configurations of the fuel cell system.

Moreover, each of the second predetermined time and the first temperature can be calculated based on a D value and Z value (heating temperature difference necessary to change the D value into 1/10 or 10 times) of the targeted microorganisms. The targeted microorganisms are not limited to one type and may be plural types. In this case, the second predetermined time may be calculated based on the D value and Z value of the microorganisms whose sterilization conditions are the severest or may be calculated based on an average value of the D values of these microorganisms and an average value of the Z values of these microorganisms.

The first predetermined time may be set to not shorter than one day and not longer than seven days, and the second predetermined time may be set to not shorter than 30 minutes and not longer than 180 minutes.

Next, one example of the fuel cell system according to Embodiment 1 will be specifically explained.

Configuration of Fuel Cell System

FIG. 1 is a block diagram schematically showing a schematic configuration of the fuel cell system according to Embodiment 1 of the present invention.

As shown in FIG. 1, a fuel cell system 100 according to Embodiment 1 includes a fuel cell 101, a cooling water circulation passage (heat medium circulation passage) 71, a cooling water tank (heat medium tank) 102, a first circulator 105, a water circulation passage 72, a recovered water tank 104, a second circulator 108, a water purifier 109, a temperature detector 111, and a controller 110. When the temperature detector 111 detects a temperature lower than the first temperature capable of sterilizing the microorganisms, the controller 110 executes a circulation operation, that is, causes the second circulator 108 to operate such that the temperature detected by the temperature detector 111 becomes the first temperature or higher. Moreover, when the temperature detector 111 detects a temperature equal to or higher than the second temperature which is higher than the first temperature and is lower than a temperature at which the heat deterioration of the water purifier 109 occurs, the controller 110 forbids the operation of the second circulator 108.

In Embodiment 1, water is used as the heat medium for recovering the exhaust heat of the fuel cell 101. In Embodiment 1, the water in the cooling water tank 102 and the cooling water circulation passage 71 is referred to as cooling water, and the water in the recovered water tank 104 and the water circulation passage 72 is referred to as recovered water.

The fuel cell 101 includes an anode 11A and a cathode 11B. A fuel gas is supplied from a fuel gas supply unit 106 through a fuel gas supply passage 73 to the anode 11A. An oxidizing gas is supplied from an oxidizing gas supply unit 107 through an oxidizing gas supply passage 74 to the cathode 11B. A fuel cell, such as a polymer electrolyte fuel cell or a phosphoric-acid fuel cell, may be used as the fuel cell 101. Since the fuel cell 101 is the same in configuration as a common fuel cell, a detailed explanation thereof is omitted.

The fuel gas supply unit 106 may have any configuration as long as it is configured to supply the fuel gas to the anode 11A of the fuel cell 101. For example, the fuel gas supply unit 106 may be constituted by a tank configured to store the fuel gas and a pump configured to cause the fuel gas to flow out from the tank or may be constituted by a hydrogen generator configured to generate the fuel gas by a reforming reaction using a raw material and water. The oxidizing gas supply unit 107 may have any configuration as long as it is configured to supply the oxidizing gas to the cathode 11B of the fuel cell 101. For example, a fan, such as a blower or a sirocco fan, may be used as the oxidizing gas supply unit 107. The fuel gas supply unit 106 or the oxidizing gas supply unit 107 may include a humidifier configured to humidify the supply gas.

In the fuel cell 101, the fuel gas supplied to the anode 11A and the oxidizing gas supplied to the cathode 11B electrochemically react with each other. Thus, water, electricity, and heat are generated. As described below, the generated heat is recovered by the cooling water flowing through the cooling water circulation passage 71. Thus, the fuel cell 101 is cooled. A part of the generated water vaporizes to humidify the reactant gas. Then, the steam having humidified the reactant gas and the generated water are discharged to the outside of the fuel cell 101 together with the unconsumed reactant gas.

Specifically, the fuel gas (off fuel gas) unconsumed in the fuel cell 101, the steam, and the generated water are discharged through an off fuel gas passage 75 to the outside of the fuel cell system 100. Moreover, the oxidizing gas (off oxidizing gas) unconsumed in the fuel cell 101, the steam, and the generated water are discharged through an off oxidizing gas passage 76 to the outside of the fuel cell system 100.

While the steam having humidified the fuel gas flows through the off fuel gas passage, it is condensed into water. The water having been condensed in the off fuel gas passage 75 and the water having been discharged to the off fuel gas passage 75 are stored in the recovered water tank 104 as the recovered water. Similarly, while the steam having humidified the oxidizing gas flows through the off oxidizing gas passage 76, it is condensed into water. The water having been condensed in the off oxidizing gas passage 76 and the water having been discharged to the off oxidizing gas passage 76 are stored in the recovered water tank 104 as the recovered water.

In the fuel cell system 100 according to Embodiment 1, the water is recovered from both the off fuel gas passage 75 and the off oxidizing gas passage 76. However, the present embodiment is not limited to this. The fuel cell system 100 may adopt any configuration as long as the water is recovered from at least one of the off fuel gas passage 75 and the off oxidizing gas passage 76. In addition, a condenser configured to accelerate the condensation of the steam may be disposed on at least one of the off fuel gas passage 75 and the off oxidizing gas passage 76. For example, a heat exchanger may be used as the condenser.

Moreover, the cooling water circulation passage 71 through which the cooling water for cooling the fuel cell 101 flows is provided in the fuel cell 101. The cooling water tank 102 and the first circulator 105 are disposed on the cooling water circulation passage 71. The first circulator 105 may have any configuration as long as it can cause the water in the cooling water circulation passage 71 to flow. For example, a pump may be used as the first circulator 105.

The recovered water tank 104 is connected to the cooling water tank 102 via the water circulation passage 72. The water circulation passage 72 includes a first water passage 72A through which the cooling water flows from the cooling water tank 102 to the recovered water tank 104 and a second water passage 72B through which the recovered water flows from the recovered water tank 104 to the cooling water tank 102. The second circulator 108 is disposed on the water circulation passage 72. The second circulator 108 is configured to cause the water to circulate between the recovered water tank 104 and the cooling water tank 102. For example, a pump may be used as the second circulator 108, or a pump and an on-off valve configured to allow water to flow through the water circulation passage 72 and block the flow of the water may be used as the second circulator 108.

The water purifier 109 is disposed on the water circulation passage 72, that is, the passage (the second water passage 72B) extending from the recovered water tank 104 to the cooling water tank 102. The water purifier 109 may have any configuration as long as it can purify the water. In Embodiment 1, the water purifier 109 is constituted by a casing filled with ion-exchange resin, and the ion-exchange resin purifies the water by adsorbing impurities (mainly ions) contained in the water. The water purifier 109 may be constituted by a casing including an activated carbon filter and/or a reverse osmosis membrane.

The temperature detector 111 is provided at the recovered water tank 104. Specifically, the temperature detector 111 is provided at a position closer to a first connecting port 104B of the recovered water tank 104 than a second connecting port 104C of the recovered water tank 104. Here, the first water passage 72A is connected to the second connecting port 104C, and the second water passage 72B is connected to the first connecting port 104B. The temperature detector 111 is configured to detect the temperature of the recovered water in the recovered water tank 104 and output the detected temperature to the controller 110. For example, a thermistor may be used as the temperature detector 111.

The first connecting port 104B and the second connecting port 104C are provided to be spaced apart from each other. Herein, the first connecting port 104B is provided at a lower portion of the recovered water tank 104, and the second connecting port 104C is provided at an upper portion of the recovered water tank 104. With this, the high-temperature cooling water supplied through the first water passage 72A to the recovered water tank 104 is prevented from being immediately supplied from the recovered water tank 104 to the second water passage 72B. Therefore, the temperature in the recovered water tank 104 easily becomes uniform. In addition, the temperature detector 111 can detect a temperature close to the average temperature of the recovered water tank 104.

In Embodiment 1, the temperature detector 111 is provided in the recovered water tank 104. However, the present embodiment is not limited to this. The temperature detector 111 may be provided in the water purifier 109 or may be disposed on a portion of the water circulation passage 72 (to be precise, the second water passage 72B), the portion being located between the recovered water tank 104 and the water purifier 109.

The controller 110 may have any configuration as long as it controls respective devices constituting the fuel cell system 100. The controller 110 includes a calculation processing portion, a storage portion, and a clock portion. Examples of the calculation processing portion are a microprocessor and a CPU, and the storage portion is constituted by a memory, and the like and stores programs for executing respective control operations. In the controller 110, the calculation processing portion reads out and executes a predetermined control program stored in the storage portion. Thus, the controller 110 processes the information and performs various control operations regarding the fuel cell system 100 including the above control operations.

The controller 110 may be constituted by one controller or may be constituted by a group of a plurality of controllers which cooperate together to execute the control operations of the fuel cell system 100. Moreover, the controller 110 may be constituted by a microcontroller or may be constituted by a MPU, a PLC (Programmable Logic Controller), a logic circuit, or the like.

Operations of Fuel Cell System

Next, the electric power generating operation of the fuel cell system 100 according to Embodiment 1 will be explained in reference to FIG. 1. The following operations are performed such that the controller 110 controls respective devices of the fuel cell system 100.

The fuel gas supply unit 106 is activated to supply the fuel gas to the anode 11A of the fuel cell 101, and the oxidizing gas supply unit 107 is activated to supply the oxidizing gas to the cathode 11B of the fuel cell 101. In the fuel cell 101, the fuel gas supplied to the anode 11A and the oxidizing gas supplied to the cathode 11B electrochemically react with each other. Thus, water, electricity, and heat are generated.

The generated electricity is supplied to an external electric power load by an electric power conditioner, not shown. The generated heat is recovered by the cooling water flowing through the cooling water circulation passage 71. Thus, the fuel cell 101 is cooled. Further, the steam in the unused reactant gas and the generated water are recovered by the recovered water tank 104. In a case where the fuel cell 101 is a polymer electrolyte fuel cell, the fuel cell 101 is generally used such that the inside of the fuel cell 101 is maintained at about 70° C. Therefore, the temperature of the cooling water in the cooling water tank 102 also becomes about 70° C.

As described above, the microorganisms may intrude into the system through, for example, an atmosphere opening of the off fuel gas passage 75 or the off oxidizing gas passage 76, an exit of a water discharge passage (not shown) of the recovered water tank 104, or the like. Then, if the intruded microorganisms proliferate in the recovered water tank 104, the water circulation passage 72, or the like, the clogging or narrowing of the water circulation passage 72 may occur, and this may deteriorate the water supply function and the water purification function.

However, in the fuel cell system 100 according to Embodiment 1, the controller 110 executes the circulation operation to suppress the proliferation of the microorganisms. Specifically, the controller 110 activates the second circulator 108 when the temperature detector 111 detects a temperature lower than the first temperature that is a temperature capable of sterilizing the microorganisms.

By the operation of the second circulator 108, the recovered water in the recovered water tank 104 is supplied through the second water passage 72B to the cooling water tank 102. The recovered water having been supplied to the cooling water tank 102 is heated (performs heat exchange with the cooling water) by being mixed with the high-temperature (for example, about 70° C.) cooling water in the cooling water tank 102. When the cooling water in the cooling water tank 102 increases, and the water level of the cooling water in the cooling water tank 102 becomes equal to or higher than a predetermined water level, the cooling water overflows and is supplied through the first water passage 72A to the recovered water tank 104. The cooling water having been supplied to the recovered water tank 104 is heated (performs heat exchange with the recovered water) by being mixed with the recovered water in the recovered water tank 104.

As above, the controller 110 causes the second circulator 108 to operate such that the recovered water temperature detected by the temperature detector 111 becomes equal to or higher than the first temperature. With this, the heat sterilization of the microorganisms in the recovered water tank 104, the water circulation passage 72, and the like can be performed, and the proliferation of the microorganisms can be suppressed.

When the recovered water temperature detected by the temperature detector 111 becomes equal to or higher than the second temperature that is a temperature lower than a temperature at which the heat deterioration of the ion-exchange resin constituting the water purifier 109 occurs, the controller 110 forbids the operation of the second circulator 108 (stops the operation of the second circulator 108). With this, the proliferation of the microorganisms in the recovered water tank 104, the water circulation passage 72, and the like can be suppressed, and the heat deterioration of the water purifier 109 can be suppressed.

Here, the first temperature can be suitably set depending on the type of the microorganisms which are prevented from proliferating. For example, the first temperature may be set to not lower than 40° C. and lower than 45° C. The second temperature can be suitably set depending on the type of the ion-exchange resin used in the water purifier. For example, the second temperature may be set to not lower than 45° C. and not higher than 50° C.

Each of a cycle (the first predetermined time) of the operation of the second circulator 108 and a time length (the second predetermined time) in which the second circulator 108 operates can be suitably set to a time by which the amount of microorganisms can be reduced by the heat sterilization of the recovered water to an amount which does not deteriorate the water supply function and the water purification function of the water purifier 109 by, for example, the clogging or narrowing of the water circulation passage 72. For example, the first predetermined time may be set to not shorter than one day and not longer than seven days, and the second predetermined time may be set to not shorter than 30 minutes and not longer than 180 minutes.

Further, each of the first temperature and the second predetermined time can be calculated based on the D value and Z value (heating temperature difference necessary to change the D value into 1/10 or 10 times) of the targeted microorganisms. The targeted microorganisms are not limited to one type and may be plural types. In this case, the second predetermined time may be calculated based on the D value and Z value of the microorganisms whose sterilization conditions are the severest or may be calculated based on an average value of the D values of these microorganisms and an average value of the Z values of these microorganisms.

More specifically, in consideration of the fact that the effect of the sterilization increases as the temperature of the recovered water in the recovered water tank 104 increases, the first temperature and the second predetermined time can be set based on the configuration and operating conditions of the fuel cell system 100, such as the temperatures in the cooling water tank 102 and the recovered water tank 104. Especially, in a case where negative ion-exchange resin having a low heatproof temperature is used as the water purifier 109, it is preferable to set the first temperature, the second predetermined time, and the amount of operation of the second circulator 108.

Even in a case where the circulation operation is not being executed, the controller 110 forbids the operation of the second circulator 108 when the temperature detected by the temperature detector 111 is equal to or higher than the second temperature. With this, the heat deterioration of the water purifier 109 can be suppressed.

The controller 110 may perform the circulation operation during the electric power generating operation of the fuel cell 101 or during the operation stop of the fuel cell system 100. In order to suppress the decrease in temperature of the fuel cell 101 and stably generate the electric power by the fuel cell 101, it is preferable that the controller 110 be configured to execute the circulation operation during the operation stop of the fuel cell system 100. In this case, the controller 110 may control the amount of operation of the second circulator 108 such that the amount of operation of the second circulator 108 is larger in a case where the fuel cell system 100 is in a stop state and the circulation operation is being performed than in a case where the fuel cell 101 is generating the electric power and the circulation operation is not being performed.

In the fuel cell system 100 according to Embodiment 1 configured as above, by the operation of the second circulator 108, the high-temperature cooling water is supplied to the recovered water tank 13. Therefore, the recovered water is increased in temperature and heated to the first temperature, which is a microorganism sterilization temperature, or higher, so that the proliferation of the microorganisms contained in the recovered water can be suppressed.

Moreover, the fuel cell system 100 according to Embodiment 1 forbids the operation of the second circulator 108 when the temperature of the recovered water becomes equal to or higher than the second temperature that is a temperature lower than a temperature at which the heat deterioration of the water purifier 109 occurs. With this, the recovered water can be prevented from being excessively heated, and the heat deterioration of the second circulator 108 can be suppressed. Therefore, by increasing the life of the water purifier 109, the maintenance frequency of the water purifier 109 can be made lower than that of each of the conventional fuel cell systems.

Modification Example 1

Next, Modification Example 1 of the fuel cell system according to Embodiment 1 will be explained.

The fuel cell system of Modification Example 1 of Embodiment 1 is configured such that the controller does not execute the circulation operation when the temperature detecting means detects a temperature equal to or lower than a third temperature that is a temperature lower than the first temperature and capable of suppressing proliferation of the microorganisms.

The fuel cell system 100 of Modification Example 1 of Embodiment 1 is the same in basic configuration as the fuel cell system 100 according to Embodiment 1, so that an explanation of the configuration thereof is omitted.

Here, the microorganisms proliferate in a predetermined temperature range and are destroyed if they are exposed to a temperature higher than the predetermined temperature range. In contrast, if the microorganisms are exposed to a temperature lower than the predetermined temperature, the proliferation thereof is suppressed. Therefore, in a case where the temperature in the water circulation passage 72 or the recovered water tank 104 is equal to or lower than the third temperature that is a temperature lower than the first temperature and capable of suppressing the proliferation of the microorganisms, the microorganisms do not adequately proliferate in the water circulation passage 72, or the like.

Therefore, the fuel cell system 100 of Modification Example 1 is configured such that the controller 110 does not execute the circulation operation if the temperature detecting means 111 detects a temperature equal to or lower than the third temperature that is a temperature lower than the first temperature and capable of suppressing the proliferation of the microorganisms. Here, the third temperature can be suitably set depending on the type of the microorganisms which are prevented from proliferating. For example, the third temperature may be set to 30° C. In Modification Example 1, the third temperature is set to 30° C. However, this is just an example. For example, in a case where a main object of the present invention is to suppress the proliferation of mold (for example, Neosartorya peudofischeri), which is large in size as one solid, as the microorganisms, the third temperature may be set to 25° C. or may be set to 20° C.

The fuel cell system 100 of Modification Example 1 configured as above can also obtain the same operational advantages as the fuel cell system 100 according to Embodiment 1. In addition, the fuel cell system 100 of Modification Example 1 is configured so as not to increase the water temperature in the water circulation passage 72 or the recovered water tank 104 unless necessary. Therefore, the decrease in energy efficiency can be suppressed, and the energy saving can be achieved.

Modification Example 2

Next, Modification Example 2 of the fuel cell system according to Embodiment 1 will be explained.

The fuel cell system of Modification Example 2 of Embodiment 1 further includes a first heat exchanger disposed on both the heat medium circulation passage and a portion of the water circulation passage, the portion being located downstream of the water purifier.

Figure 2:
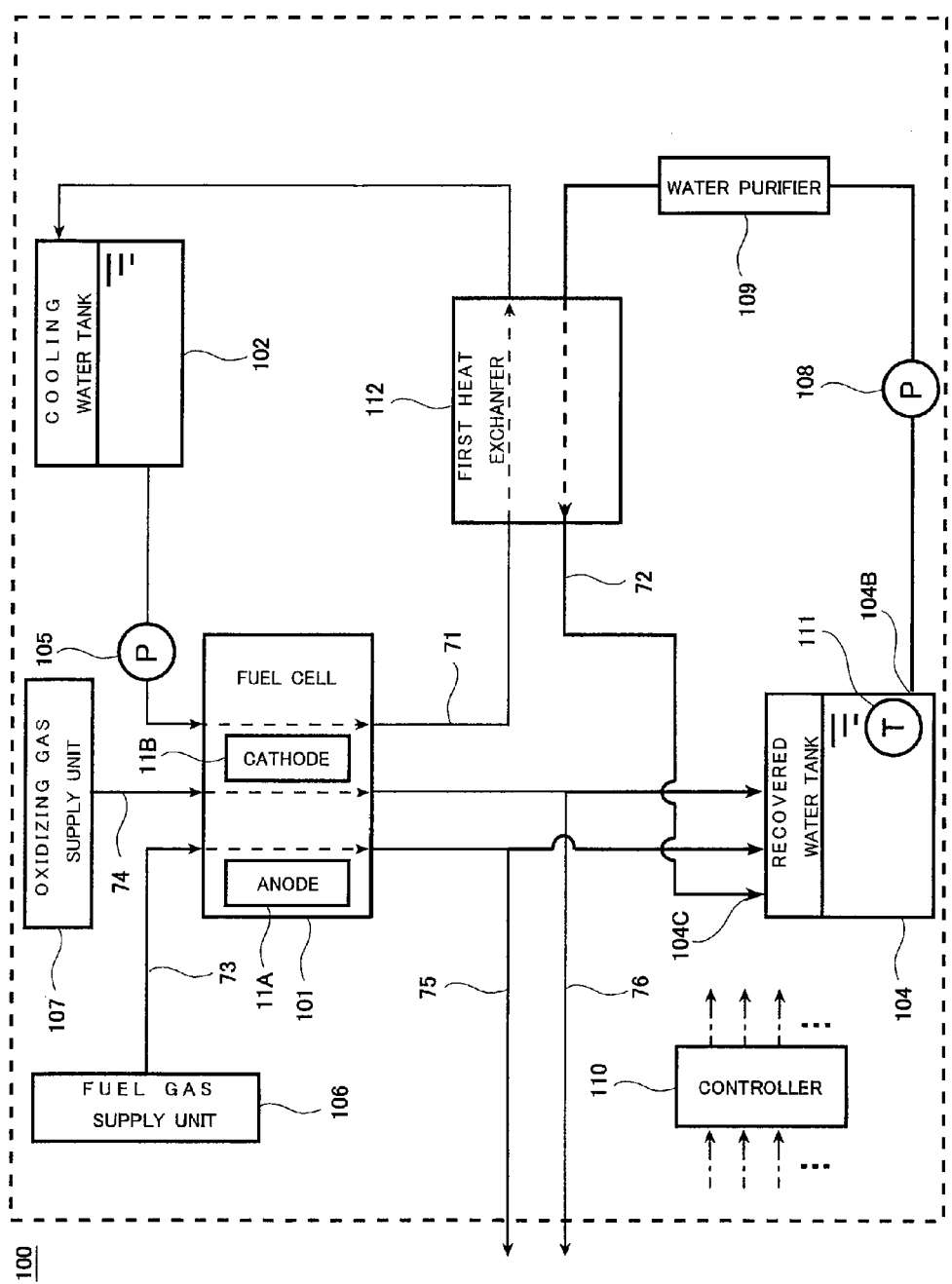
FIG. 2 is a block diagram schematically showing a schematic configuration of the fuel cell system of Modification Example 2.

FIG. 2 is a block diagram schematically showing a schematic configuration of the fuel cell system of Modification Example 2.

As shown in FIG. 2, the fuel cell system 100 of Modification Example 2 is the same in basic configuration as the fuel cell system 100 according to Embodiment 1 but is different from the fuel cell system 100 according to Embodiment 1 in that a first heat exchanger 112 is further included. Specifically, the first heat exchanger 112 is disposed on both the cooling water circulation passage 71 and a portion of the water circulation passage 72, the portion being located downstream of the water purifier 109. The first heat exchanger 112 may have any configuration as long as it can perform heat exchange between the cooling water in the cooling water circulation passage 71 and the recovered water in the water circulation passage 72. Various heat exchangers, such as a total enthalpy heat exchanger, may be used as the first heat exchanger 112.

In addition, the fuel cell system 100 of Modification Example 2 is different from the fuel cell system 100 according to Embodiment 1 in that the cooling water tank 102 is not connected to a portion (portion located downstream of the water purifier 109) of the water circulation passage 72.

While the fuel cell system 100 of Modification Example 2 configured as above is executing the circulation operation, the recovered water flowing through the water circulation passage 72 is heated by the heat exchange with the cooling water in the first heat exchanger 112. Therefore, the recovered water is increased in temperature and heated to the first temperature, which is the microorganism sterilization temperature, or higher, so that the proliferation of the microorganisms contained in the recovered water can be suppressed.

The controller 110 may activate the first circulator 105 when the temperature detector 111 detects a temperature lower than the first temperature and the circulation operation is executed (the second circulator 108 is caused to operate). With this, the heat exchange between the recovered water and the cooling water in the first heat exchanger 112 can be further accelerated.

In Modification Example 2, water (cooling water) is used as the heat medium. However, the present modification example is not limited to this. For example, an antifreezing fluid, such as an ethylene glycol containing liquid, may be used as the heat medium.

Embodiment 2

The fuel cell system according to Embodiment 2 of the present invention further includes a heater configured to heat the heat medium, and the controller activates the heater when executing the circulation operation.

In the fuel cell system according to Embodiment 2, the heater may be an electric heater provided at the heat medium tank.

Configuration of Fuel Cell System

Figure 3:
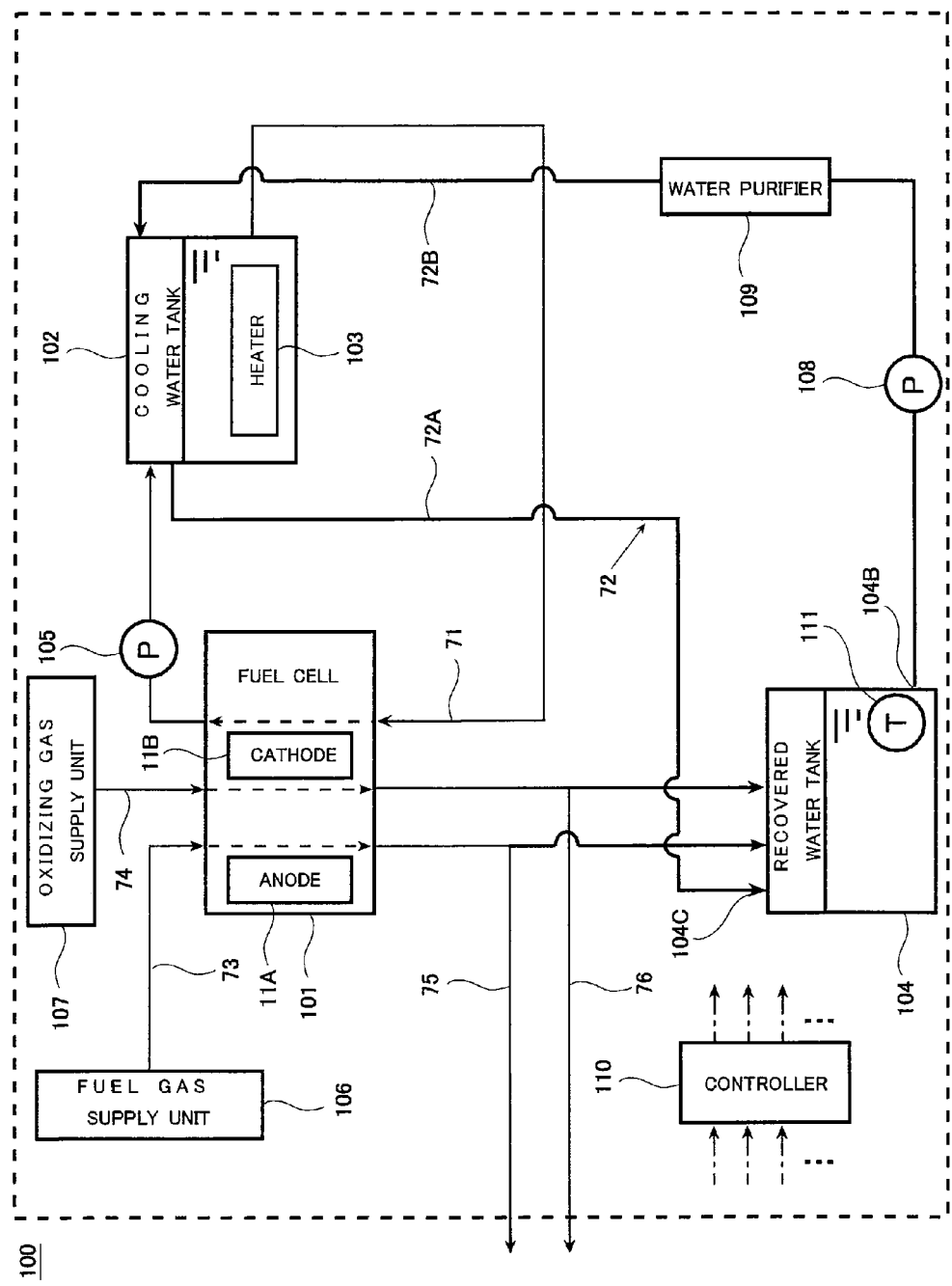
FIG. 3 is a block diagram schematically showing one example of a schematic configuration of the fuel cell system according to Embodiment 2.

FIG. 3 is a block diagram schematically showing one example of a schematic configuration of the fuel cell system according to Embodiment 2.

As shown in FIG. 3, the fuel cell system 100 according to Embodiment 2 is the same in basic configuration as the fuel cell system 100 according to Embodiment 1 but is different from the fuel cell system 100 according to Embodiment 1 in that a heater 103 is provided in the cooling water tank 102. The heater 103 may have any configuration as long as it can heat the cooling water in the cooling water tank 102. For example, the heater 103 may be constituted by an electric heater. The controller 110 is configured to activate the heater 103 when executing the circulation operation.

For example, in some cases, the temperature of the cooling water in the cooling water tank 102 is low when the fuel cell system 100 terminates its operation stop process and is in a stand-by state (state where the start-up of the fuel cell system 100 can be started if the start-up command is input).

However, in the fuel cell system 100 according to Embodiment 2, the controller 110 activates the heater 103 when executing the circulation operation. Therefore, even if the cooling water in the cooling water tank 102 is low in temperature, the cooling water is heated by the heater 103, so that the high-temperature cooling water can be supplied to the recovered water tank 13. With this, the recovered water is increased in temperature and heated to the first temperature, which is the microorganism sterilization temperature, or higher, so that the proliferation of the microorganisms contained in the recovered water can be suppressed.

The fuel cell system 100 according to Embodiment 2 configured as above can also obtain the same operational advantages as the fuel cell system 100 according to Embodiment 1. In addition, in the fuel cell system 100 according to Embodiment 2, the controller 110 activates the heater 103 when executing the circulation operation. Therefore, the recovered water can be more surely heated to the first temperature or higher, and the proliferation of the microorganisms can be suppressed.

In Embodiment 2, the heater 103 is provided in the cooling water tank 102. However, the present embodiment is not limited to this. The heater 103 may be provided inside the cooling water circulation passage 71 (including the cooling water tank 102) or outside the cooling water circulation passage 71 (including the cooling water tank 102) as long as it can heat the cooling water.

When the surplus electric power is generated in the fuel cell system 100, and the temperature detector 111 detects a temperature lower than the first temperature, the controller 110 may supply the surplus electric power to the heater 103 and execute the circulation operation.

Further, needless to say, the controller 110 is configured to stop the second circulator 108 and the heater 103 when the controller 110 executes the circulation operation and detects a temperature equal to or higher than the second temperature.

Modification Example 1

Next, Modification Example 1 of the fuel cell system according to Embodiment 2 will be explained.

The fuel cell system of Modification Example 1 of Embodiment 2 is configured such that the controller activates the heater when the circulation operation is being executed and the temperature detector does not detect a temperature equal to or higher than the first temperature.

The fuel cell system 100 of Modification Example 1 is the same in basic configuration as the fuel cell system 100 according to Embodiment 2, so that an explanation of the configuration thereof is omitted.

The fuel cell system 100 of Modification Example 1 is configured such that the controller 110 activates the heater 103 when the circulation operation is being executed and the temperature detector 111 does not detect a temperature equal to or higher than the first temperature. To be specific, the controller 110 is configured to activate the heater 103 only when the cooling water is low in temperature and the recovered water cannot be heated to the first temperature or higher.

The fuel cell system 100 of Modification Example 1 configured as above can also obtain the same operational advantages as the fuel cell system 100 according to Embodiment 2. In addition, the fuel cell system 100 of Modification Example 1 can heat the recovered water more timely. Thus, the decrease in energy efficiency can be suppressed, and the energy saving property can be improved.

Embodiment 3

The fuel cell system according to Embodiment 3 of the present invention includes: a hot water tank configured to store hot water which performs heat exchange with the heat medium; a hot water circulation passage which is connected to the hot water tank and through which the hot water circulates; a second heat exchanger disposed on both the heat medium circulation passage and the hot water circulation passage; and a third circulator disposed on the hot water circulation passage and configured to cause the hot water to circulate, and when executing the circulation operation, the controller controls the first to third circulators such that the temperature detected by the temperature detector becomes not lower than the first temperature and lower than the second temperature.

Configuration of Fuel Cell System

Figure 4:
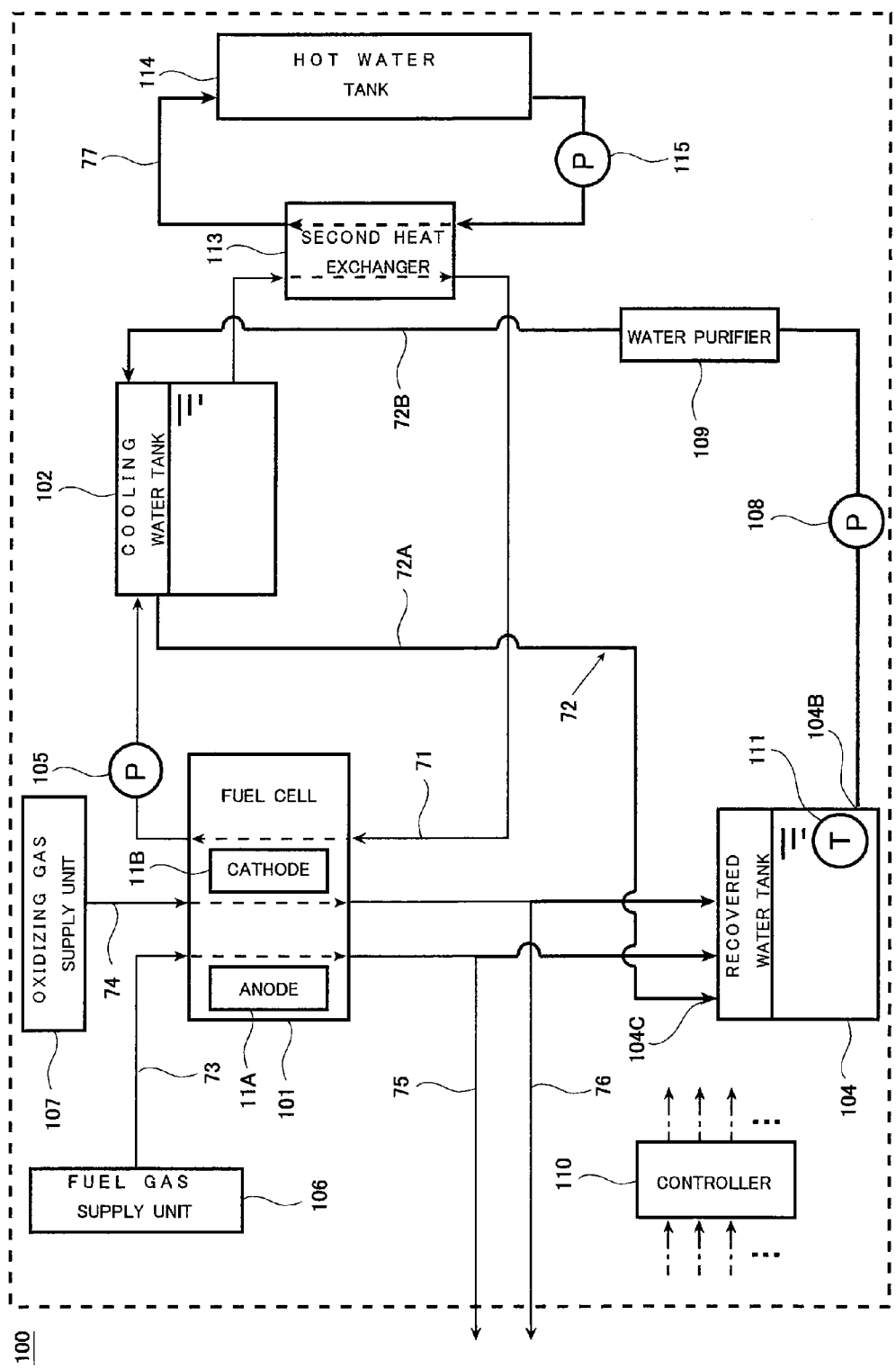
FIG. 4 is a block diagram schematically showing a schematic configuration of the fuel cell system according to Embodiment 3 of the present invention.

FIG. 4 is a block diagram schematically showing a schematic configuration of the fuel cell system according to Embodiment 3 of the present invention.

As shown in FIG. 4, the fuel cell system 100 according to Embodiment 3 is the same in basic configuration as the fuel cell system 100 according to Embodiment 1 but is different from the fuel cell system 100 according to Embodiment 1 in that a hot water circulation passage 77, a second heat exchanger 113, a hot water tank 114, and a third circulator 115 are further included. Specifically, the second heat exchanger 113 is disposed on both the water circulation passage 72 and the hot water circulation passage 77. The second heat exchanger 113 may have any configuration as long as it can perform the heat exchange between the cooling water in the cooling water circulation passage 71 and the hot water in the hot water circulation passage 77. Various heat exchangers, such as a total enthalpy heat exchanger, may be used as the second heat exchanger 113.

The hot water circulation passage 77 is connected to the hot water tank 114. More specifically, an upstream end of the hot water circulation passage 77 is connected to a lower portion of the hot water tank 114, and a downstream end of the hot water circulation passage 77 is connected to an upper portion of the hot water tank 114. The third circulator 115 is disposed on the hot water circulation passage 77. The third circulator 115 may have any configuration as long as it can cause the hot water (water) in the hot water circulation passage 77 to flow. For example, a pump may be used as the third circulator 115.

With this, the hot water existing in the lower portion of the hot water tank 114 is supplied to the hot water circulation passage 77 by the operation of the third circulator 115. Then, while the hot water having been supplied to the hot water circulation passage 77 flows through the hot water circulation passage 77, it performs the heat exchange in the second heat exchanger 113 with the cooling water flowing through the cooling water circulation passage 71, and then is supplied to the upper portion of the hot water tank 114.

When executing the circulation operation, the controller 110 controls the first circulator 105, the second circulator 108, and the third circulator 115 such that the temperature detected by the temperature detector 111 becomes not lower than the first temperature and lower than the second temperature. Specifically, for example, in a case where the water temperatures in the cooling water tank 102 and the recovered water tank 104 are low and the water temperature in the hot water tank 114 is high, the controller 110 increases the amount of operation of the third circulator 115 to accelerate the heat exchange between the cooling water and the hot water in the second heat exchanger 113, thereby heating the cooling water. In addition, for example, in a case where the water temperatures in the cooling water tank 102 and the recovered water tank 104 are high and the water temperature in the hot water tank 114 is low, the controller 110 increases the amount of operation of the third circulator 115 to accelerate the heat exchange between the cooling water and the hot water in the second heat exchanger 113, thereby heating the hot water.

The fuel cell system 100 according to Embodiment 3 configured as above can also obtain the same operational advantages as the fuel cell system 100 according to Embodiment 1.

Embodiment 4

The fuel cell system according to Embodiment 4 of the present invention further includes a water level detector configured to detect a water level in the heat medium tank, wherein: the water level detector is provided at the heat medium tank and is configured to detect a first water level that is a water level lower than an outlet port through which the heat medium is discharged to the recovered water circulation passage and a second water level that is a water level lower than the first water level; when the circulation operation is not executed and the water level detector detects a water level equal to or lower than the second water level, the controller causes the second circulator to operate until the water level detector detects the first water level, and when the water level detector detects a water level equal to or higher than the first water level, the controller stops the second circulator; and when the circulation operation is being executed and even if the water level detector detects a water level equal to or lower than the first water level, the controller causes the second circulator to operate such that the temperature detected by the temperature detector becomes not lower than the first temperature and lower than the second temperature.

Configuration of Fuel Cell System

Figure 5:
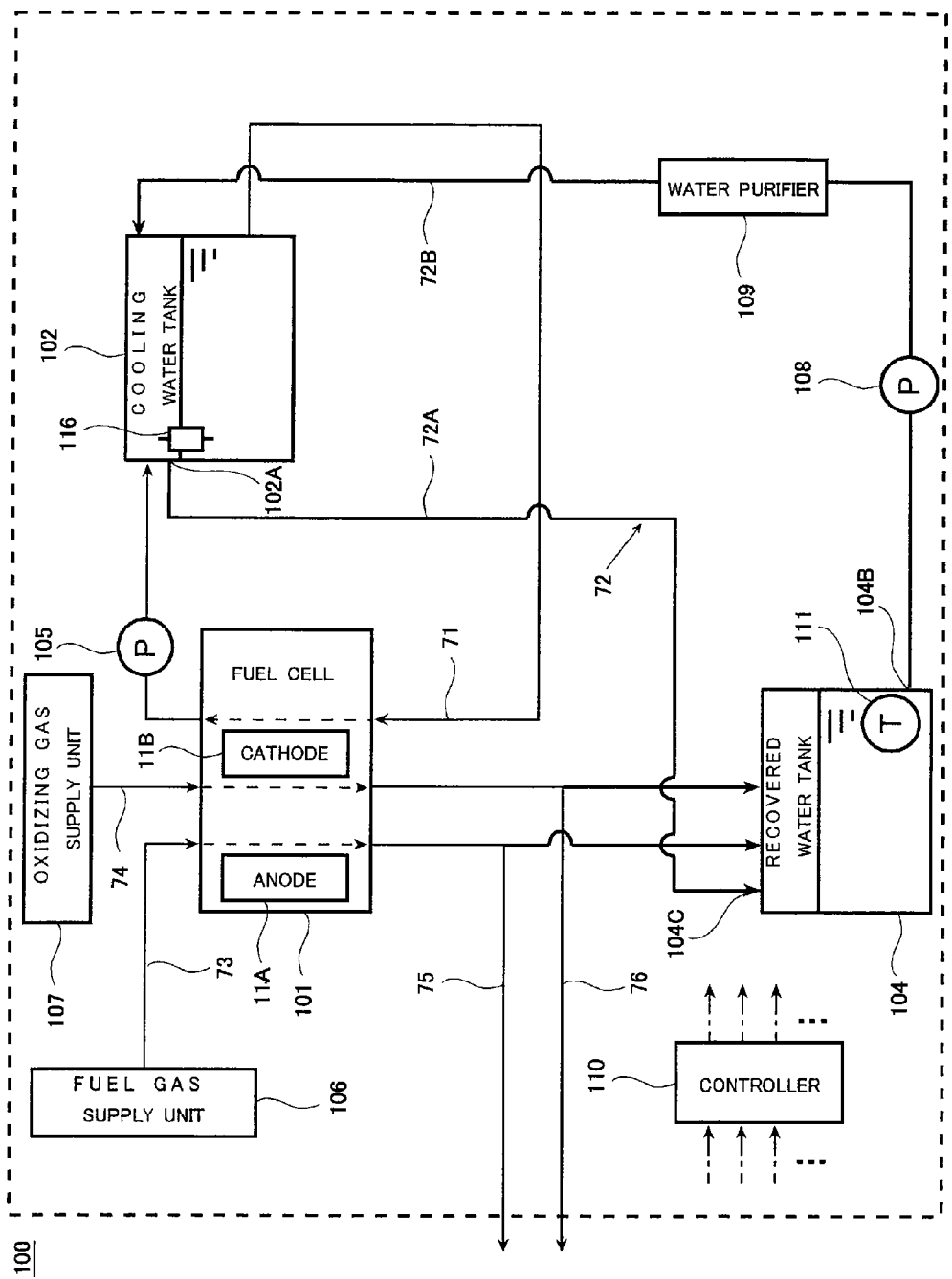
FIG. 5 is a block diagram schematically showing a schematic configuration of the fuel cell system according to Embodiment 4 of the present invention.
Figure 6:
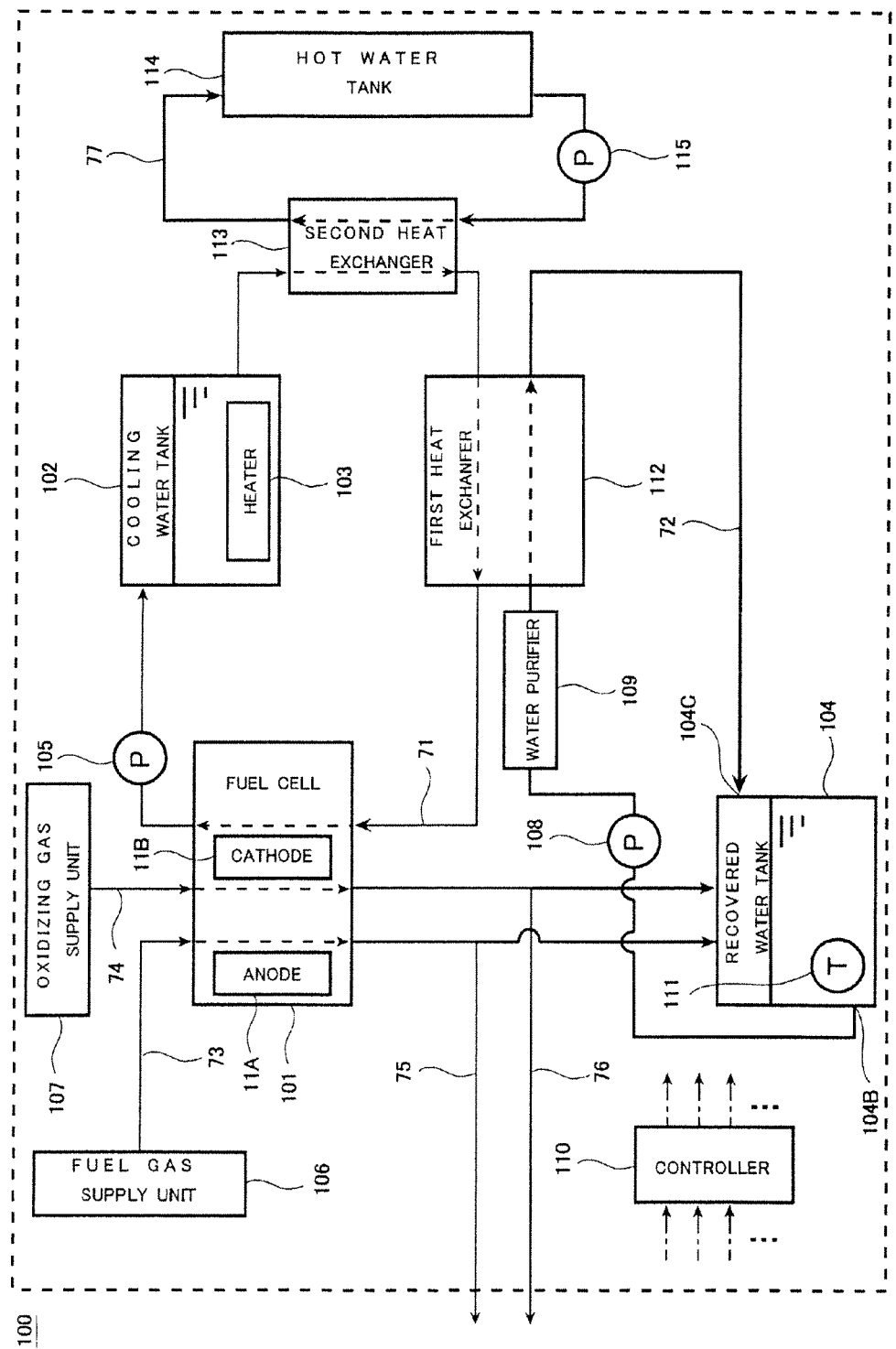
FIG. 6 is a block diagram schematically showing a schematic configuration of the fuel cell system of another example.

FIG. 5 is a block diagram schematically showing a schematic configuration of the fuel cell system according to Embodiment 4 of the present invention.

As shown in FIG. 5, the fuel cell system 100 according to Embodiment 4 is the same in basic configuration as the fuel cell system 100 according to Embodiment 1 but is different from the fuel cell system 100 according to Embodiment 1 in that a water level detector 116 is provided in the cooling water tank 102. The water level detector 116 may have any configuration as long as it can detect the water level in the cooling water tank 102 and output the detected water level of the cooling water tank 102 to the controller 110. For example, a float type water level sensor, an optical interface type water level sensor, an ultrasound type water level sensor, an electrode type water level sensor, a pressure type water level sensor, or the like may be used as the water level detector 116. The water level detector 116 is configured to detect the first water level that is a water level lower than an outlet port 102A, through which the cooling water is discharged to the water circulation passage 72 (to be precise, the first water passage 72A), of the cooling water tank 102 and the second water level lower than the first water level.

Then, in a case where the circulation operation is not executed, and the water level detector 116 detects a water level equal to or lower than the second water level, the controller 110 causes the second circulator 108 to operate until the water level detector 116 detects the first water level.

The reasons for this control are as follows. To be specific, a part of the water in the cooling water tank 102 is supplied to and used in a device constituting the fuel cell system 100. For example, a part of the water in the cooling water tank 102 is supplied to a hydrogen generating unit that is one of devices constituting the fuel gas supply unit 106 and used for a reforming reaction of a hydrocarbon gas in the hydrogen generating unit. In a case where the water in the cooling water tank 102 is supplied to devices, such as the hydrogen generating unit, the amount thereof decreases as the fuel cell 101 generates the electric power. Therefore, when the water level detector 116 detects the second water level, the controller 110 activates the second circulator 108 to supply the water in the recovered water tank 104 to the cooling water tank 102. Thus, the water supplied to the devices, such as the hydrogen generating unit, is secured. The second water level is a water level indicating that an adequate amount of water supplied to, for example, the hydrogen generating unit can be secured. The second water level can be suitably set depending on, for example, the capacity of the cooling water tank 102.

In contrast, when the water level detector 116 detects the first water level that is a water level lower than the outlet port 102A, the controller 110 stops the second circulator 108. This is to prevent a case where by causing the second circulator 108 to operate continuously, the water level in the cooling water tank 102 exceeds the first water level and reaches the outlet port 102A, and the water in the cooling water tank 102 is supplied to the recovered water tank 104.

The reasons for this control will be explained in more detail. When the fuel cell 101 is generating the electric power, the water in the cooling water tank 102 absorbs the heat of the fuel cell 101 and increases in temperature. Therefore, if a small amount of water is supplied from the cooling water tank 102 to the recovered water tank 104, the temperature of the water in the recovered water tank 104 may become a temperature at which the microorganisms tend to be generated. In contrast, if a large amount of water is supplied from the cooling water tank 102 to the recovered water tank 104, comparatively cold water is supplied from the recovered water tank 104 to the cooling water tank 102. Therefore, the water in the cooling water tank 102 decreases in temperature. If the temperature of the cooling water tank 102 decreases, the temperature of the fuel cell 101 also decreases, and the electric power generation may become unstable. Moreover, in a case where the heat exchange between the water in the cooling water tank 102 and the water in the hot water tank 114 shown in FIG. 4 is performed and the hot water is stored in the hot water tank 114, and if the water in the cooling water tank 102 decreases in temperature, the amount of available hot water becomes small, and the efficiency of the fuel cell system 100 may deteriorate. Therefore, when the water level detector 116 detects the first water level, the controller 110 stops the second circulator 108 to prevent the microorganisms from being generated in the recovered water tank 104. The first water level may be arbitrarily set as long as it is higher than the second water level and lower than the outlet port 102A of the cooling water tank 102.

Moreover, when the circulation operation is being executed, and even if the water level detector 116 detects the first water level, the controller 110 causes the second circulator 108 to operate such that the temperature detected by the temperature detector 111 becomes not lower than the first temperature and lower than the second temperature.

To be specific, when the circulation operation is not executed, the controller 110 controls the second circulator 108 based on a detection signal transmitted from the water level detector 116. When the circulation operation is executed, the controller 110 controls the second circulator 108 based on a detection signal transmitted from the temperature detector 111.

The fuel cell system 100 according to Embodiment 4 configured as above can also obtain the same operational advantages as the fuel cell system 100 according to Embodiment 1. In addition, when the circulation operation is not executed, and if the water level detector 116 detects a water level equal to or higher than the first water level, the fuel cell system 100 according to Embodiment 4 stops the second circulator 108. With this, for example, during the electric power generation in which the circulation operation is not executed, the high-temperature water in the cooling water tank 102 is not supplied to the recovered water tank 104. Therefore, the water temperature in the recovered water tank 104 can be prevented from becoming a temperature at which the microorganisms tend to be generated.

The foregoing has explained a case where the water level detector 116 can detect both the first water level and the second water level. However, the water level detector 116 may be configured to detect only one water level, and when the water level detector 116 detect this water level, the controller 110 may control the second circulator 108 such that the water, the amount of which is such that the water is not discharged through the outlet port 102A, is supplied from the recovered water tank 104 to the cooling water tank 102. Moreover, in a case where the water level detector 116 is a detector, such as the float type water level sensor, which can detect only one water level, the first water level and the second water level may be determined by utilizing a detectable water level width.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the spirit of the present invention. In addition, various inventions can be made by suitable combinations of a plurality of components disclosed in the above embodiments.

INDUSTRIAL APPLICABILITY

In accordance with the fuel cell system of the present invention and the method for operating the fuel cell system, by increasing the life of the water purifier, the maintenance frequency of the water purifier can be made lower than that of each of the conventional fuel cell systems. Therefore, the present invention is useful in the field of fuel cells.

The invention claimed is:

1. A fuel cell system including a fuel cell, the fuel cell system comprising:
a heat medium circulation passage through which a heat medium for recovering exhaust heat of the fuel cell circulates;
a heat medium tank disposed on the heat medium circulation passage and configured to store the heat medium;
a first circulator disposed on the heat medium circulation passage and configured to cause the heat medium to circulate;
a recovered water tank configured to store water recovered from an exhaust gas generated by the fuel cell system;
a water circulation passage which is connected to the recovered water tank and through which the water circulates;
a second circulator disposed on the water circulation passage and configured to cause the water to circulate;
a water purifier disposed on the water circulation passage and configured to purify the water;
a temperature detector provided at any one of the recovered water tank, the water purifier, and the water circulation passage extending between the recovered water tank and the water purifier and configured to detect a temperature of the water;
a controller;
a hot water tank configured to store hot water which performs heat exchange with the heat medium;
a hot water circulation passage which is connected to the hot water tank and through which the hot water circulates;
a second heat exchanger disposed on both the heat medium circulation passage and the hot water circulation passage; and
a third circulator disposed on the hot water circulation passage and configured to cause the hot water to circulate, wherein:
the heat medium circulation passage and the water circulation passage are configured so as to realize heat exchange between the heat medium and the water,
the controller includes one or more of a microcomputer, a micro processing unit (MPU), a programmable logic controller (PLC) and a logic circuit, and a memory storing a program,
the program, when executed by the one or more of a microcomputer, an MPU, a PLC and a logic circuit, causes the controller to, while the fuel cell system is in a stop state:
execute a circulation operation in which when the temperature detector detects a temperature lower than a first temperature capable of sterilizing microorganisms, the first to third circulators are controlled such that the temperature detected by the temperature detector becomes not lower than the first temperature and lower than a second temperature that is a temperature higher than the first temperature and lower than a temperature at which heat deterioration of the water purifier occurs; and
forbid the operation of the second circulator when the temperature detector detects a temperature equal to or higher than the second temperature,
the stop state is a period from when the controller starts a stop process of the fuel cell system in a case where a stop command is input to the controller or in a case where a predetermined stop time has come until when the stop process terminates, and the program, when executed, further causes the controller to execute the circulation operation for a second predetermined time every first predetermined time.

2. The fuel cell system according to claim 1, wherein the heat medium tank is connected to a portion of the water circulation passage, the portion being located downstream of the water purifier.

3. The fuel cell system according to claim 1, further comprising a first heat exchanger disposed on both the heat medium circulation passage and a portion of the water circulation passage, the portion being located downstream of the water purifier, wherein
the heat medium circulation passage and the water circulation passage are configured such that the first heat exchanger is able to perform heat exchange between the heat medium and the water.

4. The fuel cell system according to claim 1, further comprising a heater configured to heat the heat medium, wherein
the program, when executed, further causes the controller to activate the heater when executing the circulation operation.

5. The fuel cell system according to claim 1, further comprising a heater configured to heat the heat medium, wherein
the program, when executed, further causes the controller to activate the heater when the circulation operation is being executed and the temperature detector does not detect a temperature equal to or higher than the first temperature.

6. The fuel cell system according to claim 4, wherein the heater is an electric heater provided at the heat medium tank.

7. The fuel cell system according to claim 1, further comprising a water level detector configured to detect a water level in the heat medium tank, wherein:
the heat medium tank is connected to the water circulation passage,
the water level detector is provided at the heat medium tank and is configured to detect a first water level that is a water level lower than an outlet port through which the heat medium is discharged to the water circulation passage and a second water level that is a water level lower than the first water level,
the program, when executed, further causes the controller, when the circulation operation is not executed and the water level detector detects a water level equal to or lower than the second water level, to cause the second circulator to operate until the water level detector detects the first water level, and when the water level detector detects a water level equal to or higher than the first water level, to stop the second circulator, and
the program, when executed, further causes the controller, when the circulation operation is being executed and even if the water level detector detects a water level equal to or lower than the first water level, to cause the second circulator to operate such that the temperature detected by the temperature detector becomes not lower than the first temperature and lower than the second temperature.

8. The fuel cell system according to claim 1, wherein the program, when executed, further causes the controller to control an amount of operation of the second circulator such that the amount of operation of the second circulator is larger in a case where the circulation operation is performed while the fuel cell system is in the stop state than in a case where the circulation operation is not performed while the fuel cell is generating electric power.

9. The fuel cell system according to claim 2, wherein:
the water circulation passage includes a first water passage through which the heat medium is supplied from the heat medium tank to the recovered water tank and a second water passage through which the water is supplied from the recovered water tank to the heat medium tank, and
the temperature detector is provided at a position which is closer to a second connecting port of the recovered water tank than a first connecting port of the recovered water tank, the first water passage being connected the first connecting port, the second water passage being connected to the second connecting port.

10. The fuel cell system according to claim 1, wherein:
the first predetermined time is set to not shorter than one day and not longer than seven days, and
the second predetermined time is set to not shorter than 30 minutes and not longer than 180 minutes.

11. The fuel cell system according to claim 1, wherein the program, when executed, further causes the controller not to execute the circulation operation when the temperature detecting means detector detects a temperature equal to or lower than a third temperature that is a temperature lower than the first temperature and capable of suppressing proliferation of the microorganisms.

12. The fuel cell system according to claim 1, wherein:
the first temperature is set to not lower than 40° C. and lower than 45° C., and
the second temperature is set to not lower than 45° C. and not higher than 50° C.

13. A method for operating a fuel cell system including a fuel cell, the fuel cell system including:
a heat medium circulation passage through which a heat medium for recovering exhaust heat of the fuel cell circulates;
a heat medium tank disposed on the heat medium circulation passage and configured to store the heat medium;
a first circulator disposed on the heat medium circulation passage and configured to cause the heat medium to circulate;
a recovered water tank configured to store water recovered from an exhaust gas generated by the fuel cell system;
a water circulation passage which is connected to the recovered water tank and through which the water circulates;
a second circulator disposed on the water circulation passage and configured to cause the water to circulate;
a water purifier disposed on the water circulation passage and configured to purify the water;
a temperature detector provided at any one of the recovered water tank, the water purifier, and the water circulation passage extending between the recovered water tank and the water purifier and configured to detect a temperature of the water;
a hot water tank configured to store hot water which performs heat exchange with the heat medium;
a hot water circulation passage which is connected to the hot water tank and through which the hot water circulates;
a second heat exchanger disposed on both the heat medium circulation passage and the hot water circulation passage; and
a third circulator disposed on the hot water circulation passage and configured to cause the hot water to circulate,
the heat medium circulation passage and the water circulation passage being configured so as to realize heat exchange between the heat medium and the water,
the method comprising the steps of, while the fuel cell system is in a stop state:
when the temperature detector detects a temperature lower than a first temperature capable of sterilizing microorganisms, executing a circulation operation by causing the first to third circulators to operate such that the temperature detected by the temperature detector becomes not lower than the first temperature and lower than a second temperature that is a temperature higher than the first temperature and lower than a temperature at which heat deterioration of the water purifier occurs; and
forbidding the circulation operation of the second circulator when the temperature detector detects a temperature equal to or higher than second temperature,
wherein the circulation operation is executed for a second predetermined time every first predetermined time.

14. The method according to claim 13, wherein:
the fuel cell system further comprises a water level detector configured to detect a water level in the heat medium tank,
the heat medium tank is connected to the water circulation passage,
the water level detector is provided at the heat medium tank and is configured to detect a first water level that is a water level lower than an outlet port through which the heat medium is discharged to the water circulation passage and a second water level that is a water level lower than the first water level, and
the method further comprises steps of:
when the circulation operation is not executed and the water level detector detects a water level equal to or lower than the second water level, causing the second circulator to operate until the water level detector detects the first water level, and when the water level detector detects a water level equal to or higher than the first water level, stopping the second circulator; and
when the circulation operation is being executed and even if the water level detector detects a water level equal to or lower than the first water level, causing the second circulator to operate such that the temperature detected by the temperature detector becomes not lower than the first temperature and lower than the second temperature.

15. The method according to claim 13, wherein
an amount of operation of the second circulator is controlled such that the amount of operation of the second circulator is larger in a case where the circulation operation is performed while the fuel cell system is in the stop state than in a case where the circulation operation is not performed while the fuel cell is generating electric power.

16. The method according to claim 13, wherein:
the first predetermined time is set to not shorter than one day and not longer than seven days, and
the second predetermined time is set to not shorter than 30 minutes and not longer than 180 minutes.

17. The method according to claim 13, wherein the circulation operation is not executed when the temperature detecting means detector detects a temperature equal to or lower than a third temperature that is a temperature lower than the first temperature and capable of suppressing proliferation of the microorganisms.

18. The method according to claim 13, wherein:
the first temperature is set to not lower than 40° C. and lower than 45° C., and
the second temperature is set to not lower than 45° C. and not higher than 50° C.

* * * * *